US011170928B2

(12) United States Patent
Ge et al.

(10) Patent No.: US 11,170,928 B2
(45) Date of Patent: Nov. 9, 2021

(54) AUTOMOTIVE VARIABLE VOLTAGE CONVERTER WITH INDUCTOR HAVING HIDDEN AIR GAP

(71) Applicant: Ford Global Technologies, LLC, Dearborn, MI (US)

(72) Inventors: Baoming Ge, Okemos, MI (US); Lihua Chen, Farmington Hills, MI (US); Serdar Hakki Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/786,424

(22) Filed: Feb. 10, 2020

(65) Prior Publication Data

US 2021/0249175 A1    Aug. 12, 2021

(51) Int. Cl.
| | |
|---|---|
| *H01F 27/24* | (2006.01) |
| *H01F 27/28* | (2006.01) |
| *H01F 27/38* | (2006.01) |
| *H01F 3/14* | (2006.01) |
| *B60L 50/51* | (2019.01) |
| *H02P 27/06* | (2006.01) |
| *H02M 7/537* | (2006.01) |
| *H02M 7/00* | (2006.01) |

(52) U.S. Cl.
CPC .............. *H01F 27/24* (2013.01); *B60L 50/51* (2019.02); *H01F 3/14* (2013.01); *H01F 27/28* (2013.01); *H01F 27/38* (2013.01); *H02M 7/003* (2013.01); *H02M 7/537* (2013.01); *H02P 27/06* (2013.01); *B60L 2210/40* (2013.01)

(58) Field of Classification Search
CPC . H01F 27/24; H01F 27/38; H01F 3/14; H01F 3/00; H01F 27/28; H02M 7/003; H02M 7/537; H02P 27/06; B60L 50/51; B60L 2210/40
See application file for complete search history.

(56) References Cited

U.S. PATENT DOCUMENTS

| | | | |
|---|---|---|---|
| 4,491,819 A | 1/1985 | Ray | |
| 9,001,524 B1 * | 4/2015 | Akre | ....................... H01L 23/36 361/807 |
| 2007/0080769 A1 * | 4/2007 | Thiel | ........................ H01F 3/14 336/65 |
| 2015/0091686 A1 | 4/2015 | Ding et al. | |
| 2016/0236579 A1 * | 8/2016 | Yim | ........................ H02J 7/022 |

* cited by examiner

*Primary Examiner* — John W Poos
*Assistant Examiner* — Alex W Lam
(74) *Attorney, Agent, or Firm* — David B. Kelley; Brooks Kushman P.C.

(57) ABSTRACT

An automotive power converter includes a pair of series connected switches and an inductor including a core having a leg, a winding wound around the leg, and a terminal center tapping the switches. The leg includes a plurality of alternating frames and solid blocks arranged to define a continuous contact surface for the winding and to define internal cavities within the leg such that each of the frames surrounds one of the internal cavities.

18 Claims, 6 Drawing Sheets

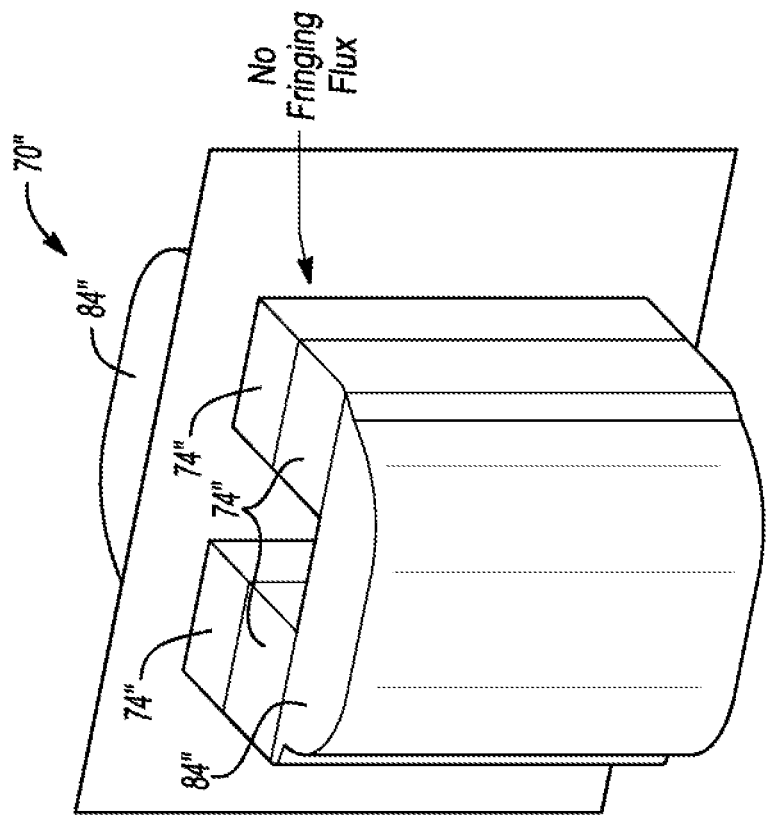
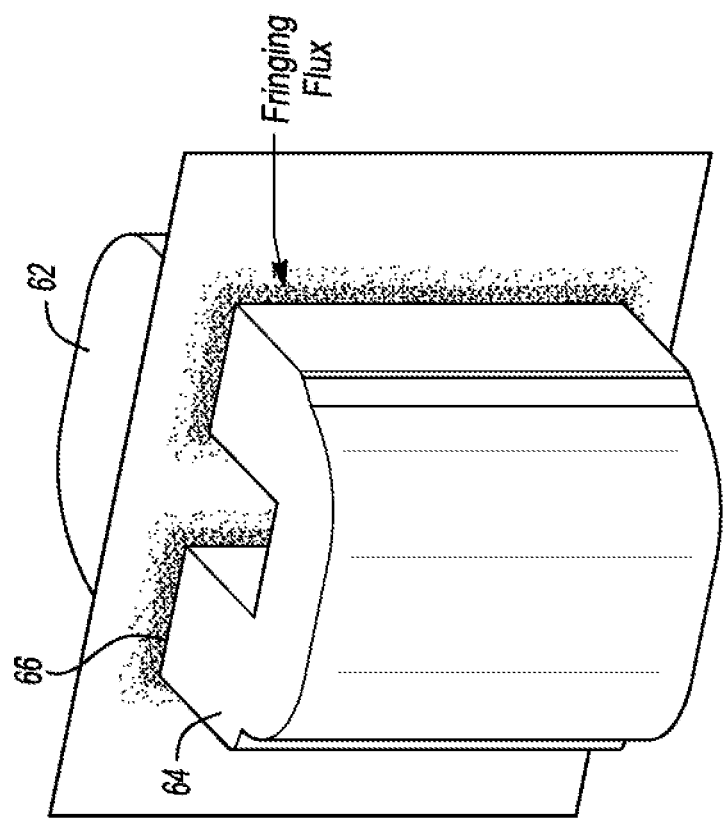

AUTOMOTIVE VARIABLE VOLTAGE CONVERTER WITH INDUCTOR HAVING HIDDEN AIR GAP

TECHNICAL FIELD

This disclosure relates to automotive power electronics components.

BACKGROUND

An electrified vehicle may contain one or more electric machines for propulsion, and a traction battery to provide energy for the electric machines. As the electric machines and traction battery may require differing electrical parameters, electrical communication between them may require modification of the power provided or consumed.

SUMMARY

An automotive vehicle includes a traction battery, an electric machine, and a variable voltage converter configured to transfer power between the traction battery and electric machine. The variable voltage converter has an inductor including a core having a pair of spaced apart legs and a winding wound around each of the legs. Each of the legs defines a series of rectangularly shaped cavities completely internal to the leg that create air gaps between portions of the leg. Each of the legs may include a plurality of alternating frames and solid blocks. Each of the frames may surround one of the rectangularly shaped cavities. A material permeability of the frames may be less than a material permeability of the solid blocks. A material of the frames and solid blocks may be same. A number of the frames may be greater than a number of the solid blocks. The core may further have a pair of yokes in contact with opposite ends of the legs such that the core has a toroidal shape. The leg may include a plurality of blocks, each defining a recessed portion on at least one major face thereof, stacked together to form a continuous contact surface for the winding such that the recessed portions define the rectangularly shaped cavities.

An automotive power converter includes a pair of series connected switches, and an inductor including a core having a leg, a winding wound around the leg, and a terminal center tapping the switches. The leg includes a plurality of alternating frames and solid blocks arranged to define a continuous contact surface for the winding and to define internal cavities within the leg such that each of the frames surrounds one of the internal cavities. A material permeability of the frames may be less than a material permeability of the solid blocks. A material of the frames and solid blocks may be same. The core may further have a second leg spaced away from the first leg, and the winding may be wound around the second leg. The core may further have a pair of yokes in contact with opposite ends of the leg such that the core has a toroidal shape. A material permeability of the frames may be less than a material permeability of the yokes. A number of the frames may be greater than a number of the solid blocks.

An automotive power converter includes a pair of series connected switches, and an inductor including a core having a leg, a winding wound around the leg, and a terminal center tapping the switches. The leg includes a plurality of blocks, each defining a recessed portion on at least one major face thereof, stacked together to form a continuous contact surface for the winding such that the recessed portions define cavities completely internal to the leg that create internal air gaps between the blocks. The core may further have a second leg spaced away from the first leg, and the winding may be wound around the second leg. The core may further have a pair of yokes in contact with opposite ends of the leg such that the core has a toroidal shape. The cavities may be rectangularly shaped.

BRIEF DESCRIPTION OF THE DRAWINGS

FIGS. 7A and 7B are perspective views of the cores of FIGS. 2 and 6 respectively.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
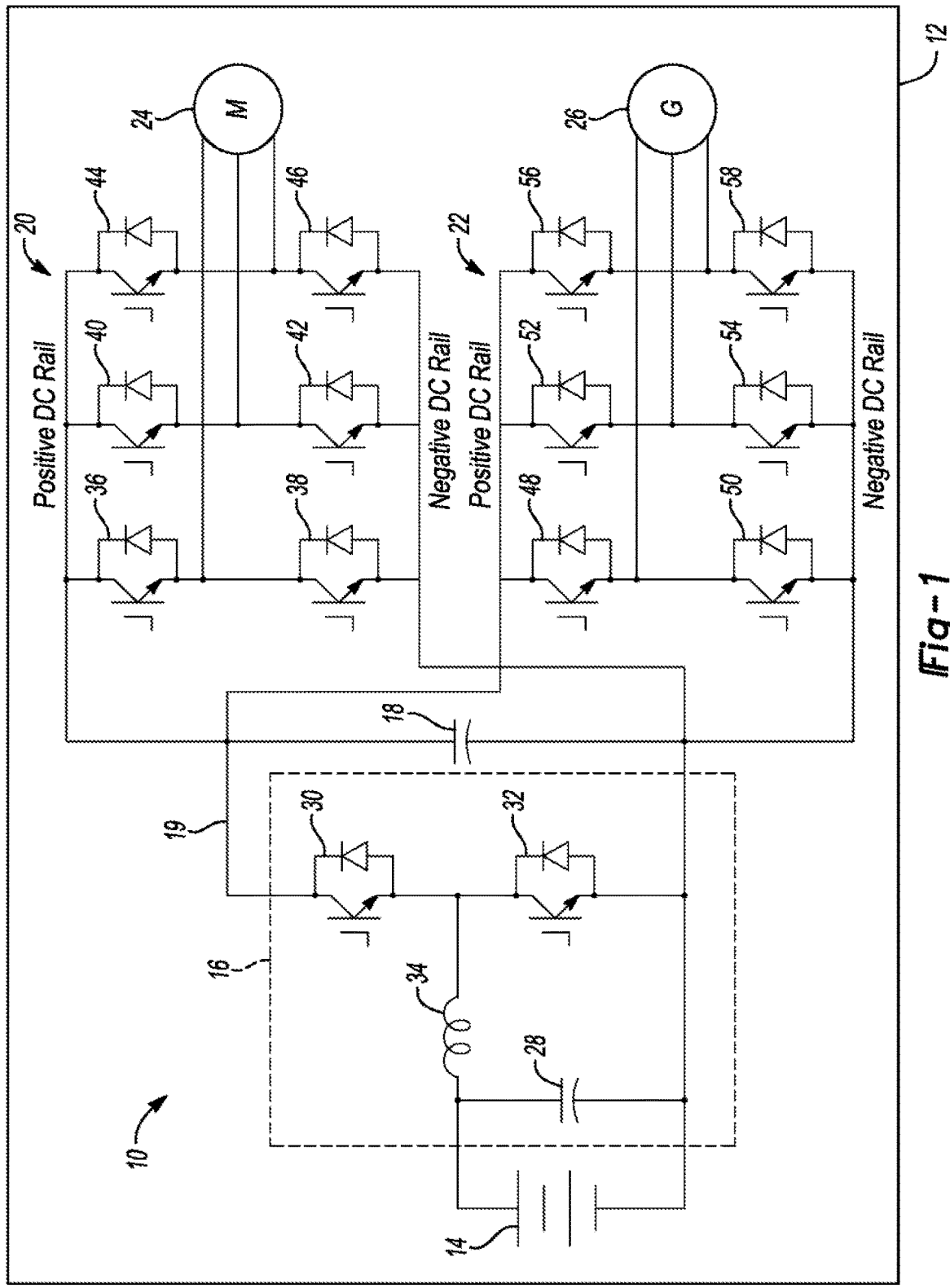
FIG. 1 is a schematic diagram of an electric drive system.

Power electronics converters/inverters have been extensively used in hybrid electric vehicle and electric vehicle drive systems. As shown in FIG. 1, an electric drive system 10 for a vehicle 12 includes a traction battery 14, a variable voltage converter 16, a DC-link capacitor 18 for DC bus 19, two power converters (DC-AC inverters) 20, 22, a motor 24, and a generator 26. The variable voltage converter 16 includes a capacitor 28 in parallel with the traction battery 14, a pair of series connected switches 30, 32 (e.g., transistors), and a power inductor 34 between the capacitor and series connected switches 30, 32. A terminal of the power inductor 34 center taps the series connected switches 30, 32.

The DC-AC inverter 20 includes, in this example, three pairs of series connected switches 36, 38, 40, 42, 44, 46. Each of the pairs defines a corresponding phase leg for the motor 24. The DC-AC inverter 26 also includes three pairs of series connected switches 48, 50, 52, 54, 56, 58. Each of the pairs defines a corresponding phase leg for the motor generator 26. The switches 36, 38, 40, 42, 44, 46, 48, 50, 52, 54, 56, 58 can be insulated gate bipolar transistors (IGBTs), metal oxide semiconductor field effect transistors (MOS- FETs), or other controllable semiconductor devices. In the following examples, the switches 36, 38, 40, 42, 44, 46, 48, 50, 52, 54, 56, 58 are shown to be IGBTs.

A voltage associated with power from the traction battery 14 may be increased by operation of the variable voltage converter 16 for eventual delivery to the DC-AC inverter 20 and thus the motor 24 to propel the vehicle 12. Likewise, regenerative power captured by the generator 26 may be passed through the DC-AC inverter 22 and so on for storage in the traction battery 14.

Figure 2:
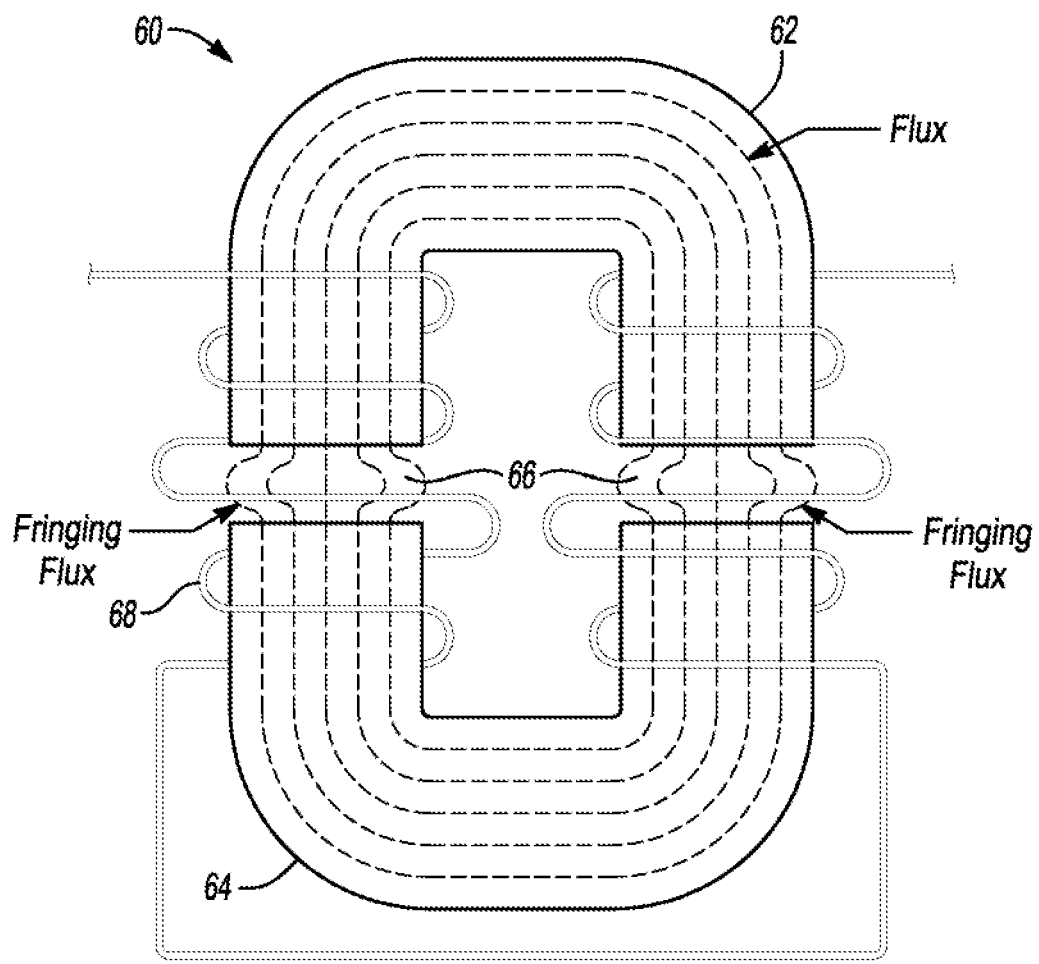
FIG. 2 is a plan view of a conventional inductor.

FIG. 2 shows a conventional power inductor 60 that can be used by a variable voltage converter, such as the variable voltage converter 16 of FIG. 1. It includes a pair of U-shaped cores 62, 64 arranged to define an air gap 66 therebetween and a coil 68 wound around the U-shaped cores 62, 64. High current capability of the power inductor 60 typically requires the air gap 66 to be large, which may impact inductance at low current. Moreover, presence of the air gap 66 causes fringing flux between the U-shaped cores 62, 64, which can result in high copper AC loss. A powder core with low permeability may instead be used to eliminate the air gap 66 and the corresponding fringing flux and copper AC loss. Such power inductors, however, are generally larger and heavier than their air gapped counterparts.

Here, power inductors are proposed with hidden air gaps in the core to eliminate fringing flux and reduce associated copper AC loss. These power inductors may have high inductance at low current levels to reduce ripple current, and do not require air gap separator materials.

Figure 4:
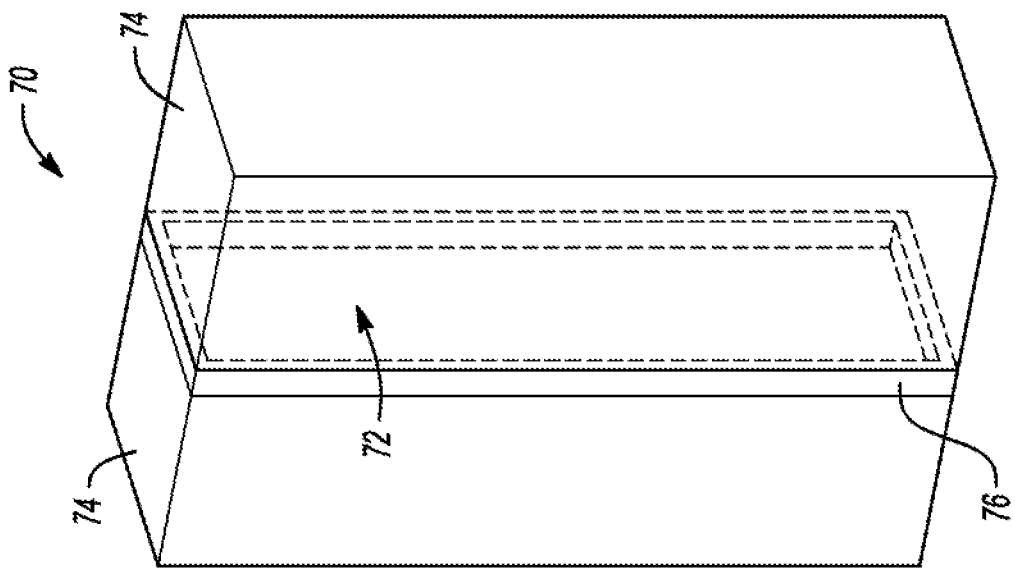
FIG. 4 is a perspective view of two blocks and a frame arranged to define a hidden air gap.
Figure 3:
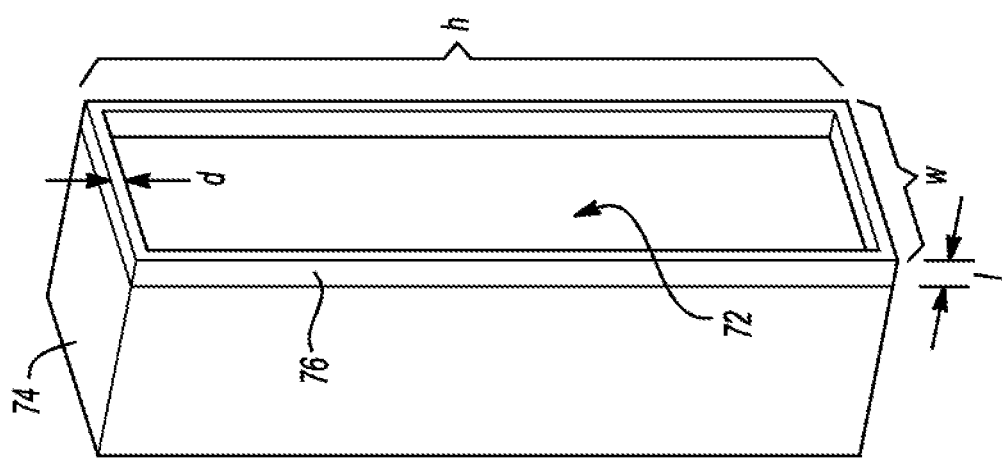
FIG. 3 is a perspective view of a block and frame arranged to define a hidden air gap.

FIGS. 3 and 4 show portions of a core 70 with a hidden air gap (internal cavity) 72. It includes solid blocks 74 and a frame 76, which surrounds the hidden air gap 72. As the name suggests, the solid blocks 74 are solid blocks of core material. The solid blocks 74 and frame 76 can be made from the same or different core material. If different, a core material for the frame 76 can be selected such that the permeability of the frame 76 is less than the permeability of the solid blocks 74.

The frame 76 has a perimeter that matches the solid blocks 74 so that when stacked together in alternating fashion, the solid blocks 74 and frame 76 provide a continuous surface on which a winding may be wound. That is, the solid blocks 74 and frame 76 do not have the appearance of being separated by a conventional air gap (see FIG. 2).

The frame 76 has a width, w, and a height, h, that generally matches that of the solid blocks 74. Thus, the perimeter of the frame 76 matches that of the solid blocks 74 as mentioned above. The frame 76 also has a length, l, and an internal depth, d. The length, l, determines the spacing between the blocks 74. The length, l, and the internal depth, d, together effectively define the volume of the hidden air gap 72. While the overall inductor size may dictate the values for the width, w, and the height, h, performance considerations may dictate the values for the length, l, and internal depth, d. The larger the length, l, the larger the volume of the hidden air gap 72. The larger the internal depth, d, the smaller the volume of the hidden air gap 72. Testing, simulation, etc. can be used to select the optimum dimensions.

Figure 5:
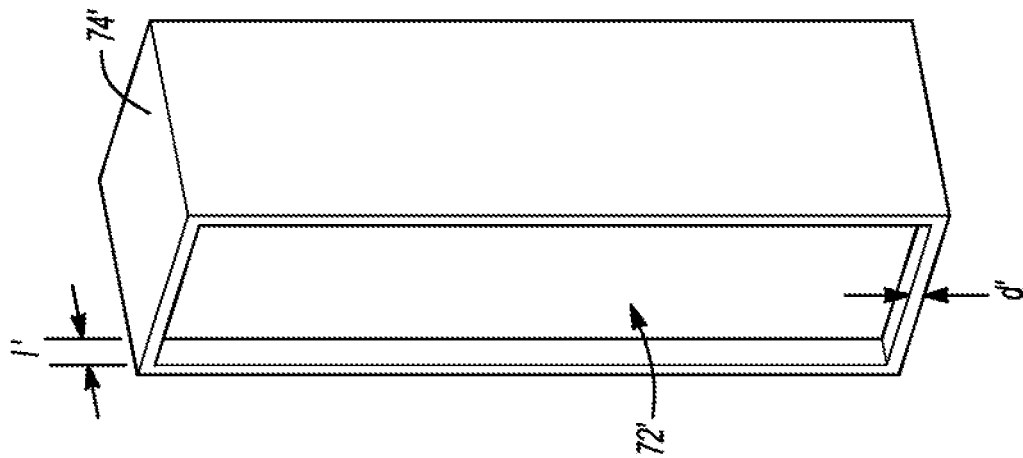
FIG. 5 is a perspective view of a recessed block.

FIG. 5 shows an alternative solid block 74'. It has a recess on a major face (largest face) that defines hidden air gap 72'. Put a different way, the frame and solid block of FIGS. 3 and 4 have been integrated into a single piece. In other examples, the recess may be defined on both major faces (see solid blocks 74" of FIG. 6).

Like the frame 76 of FIGS. 3 and 4, the integral frame of the solid block 74' has a length, l', and an internal depth, d', which together effectively define the volume of the hidden air gap 72'. Put a different way, the frame and solid block of FIGS. 3 and 4 have been integrated into a single piece.

Figure 6:
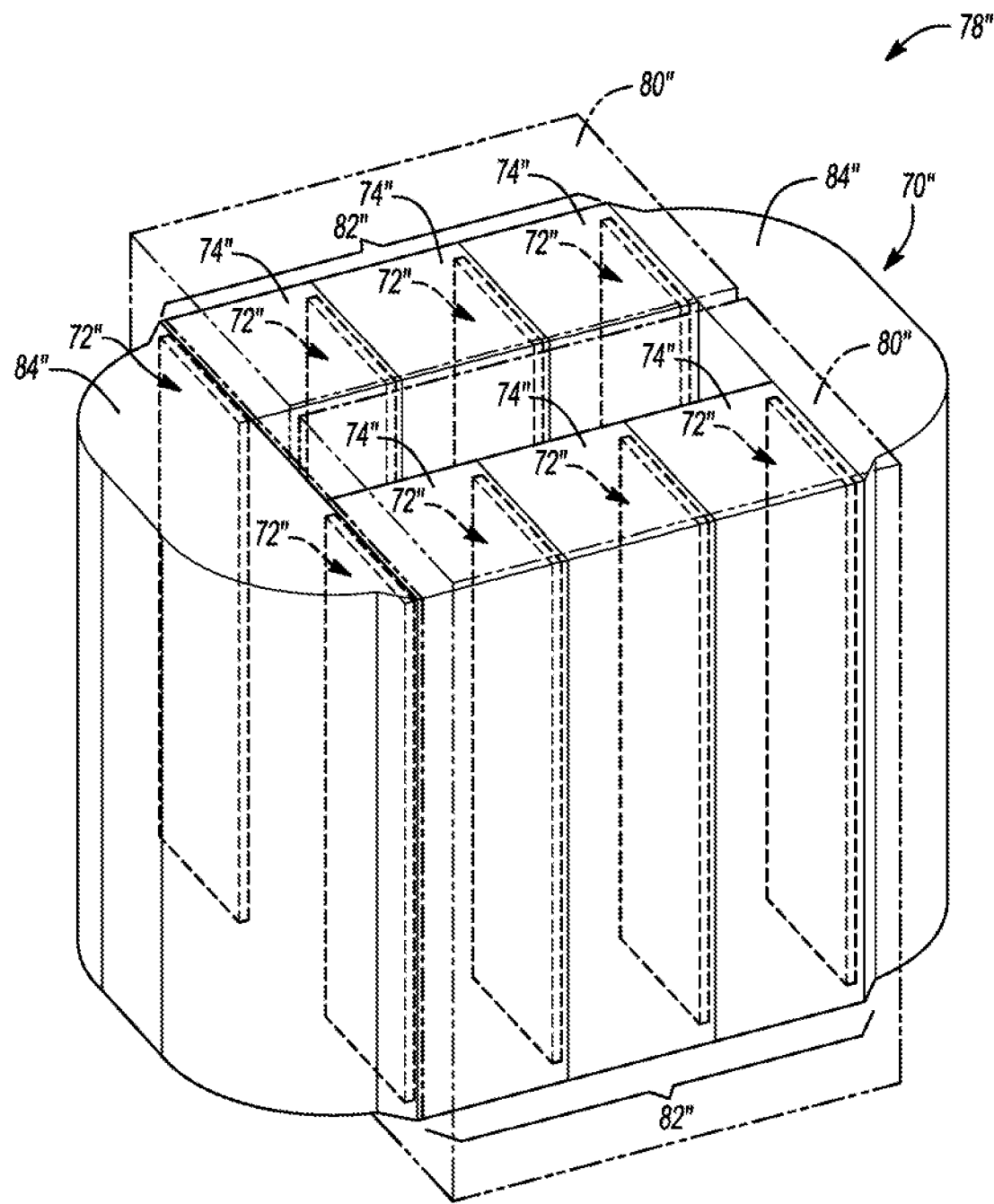
FIG. 6 is a perspective view of an inductor with hidden air gaps.

FIG. 6 shows an example power inductor 78" including a core 70" and windings 80". The core 70" includes legs 82" and yokes 84" in contact with opposite ends of the legs 82" such that the core 70" has a toroidal shape. The legs 82", in this example, each include solid blocks 74", that have recesses on opposite major faces thereof, stacked together such that the recesses define hidden air gaps 72". There is no air gap exposed to the outside of the core 70" because the hidden air gaps 72" are inside the core 70".

FIGS. 7A and 7B show the flux density of the U-shaped cores 62, 64 (FIG. 2) and the core 70" (FIG. 6). For FIG. 7A, analysis was performed within the gap 66 to determine the extent of the fringing flux at that location. For FIG. 7B, analysis was performed at the seam between two of the solid blocks 74" for similar reasons. As apparent from these figures, fringing flux is present at the specified location of FIG. 7A unlike FIG. 7B. Inductor losses associated with the U-shaped cores 62, 64 would thus be greater than inductor losses associated with the core 70".

For the power inductors contemplated herein, flux primarily passes through the frame or integrated frame portions rather than an air gap that may be present between blocks when inductor current is low, which is equivalent to an inductor with no air gap. With increasing current, the core permeability of the frame or integrated frame portions decrease more than that of the solid blocks, which effectively increases the air gap of the core. In this scenario, the flux has two parts: flux that passes through the hidden air gap and flux that passes through the frame or integrated frame portions. Thus when current is high, the effective air gap is large to support a high magnetic field strength. The proposed power inductors may exhibit a large inductance when current is low due to an effectively small air gap. The proposed power inductors may also have high current capability due to an effectively large air gap at high current. The effective air gap adaptively changes with power inductor current level.

Figure 8:
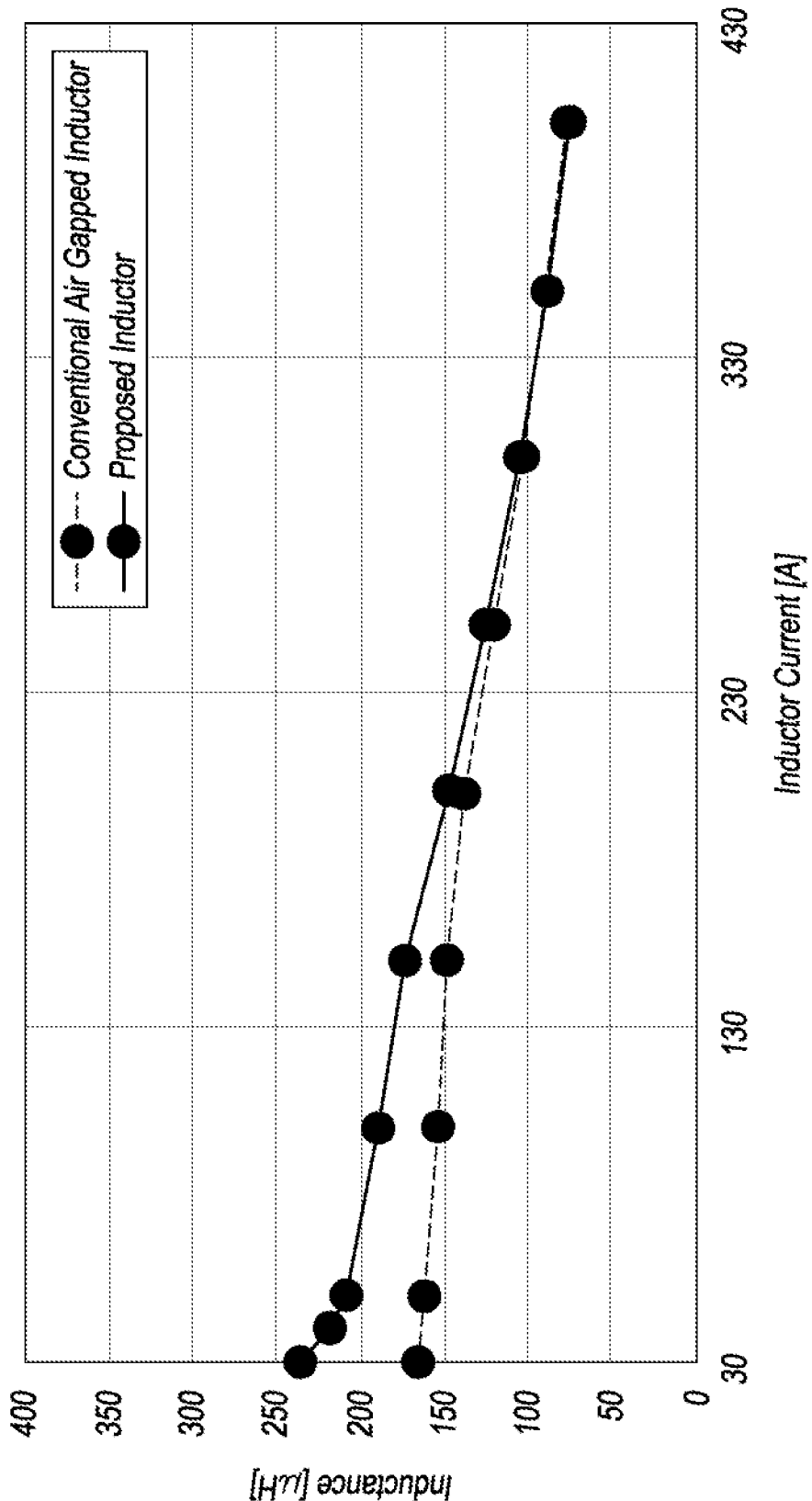
FIG. 8 is a plot of inductance versus inductor current for conventional and proposed inductors.

FIG. 8 is a plot of inductance versus current for a conventional and proposed inductor. The proposed inductor has higher inductance than the conventional inductor when inductor current is less than 290 A. Both have high current capability.

The words used in the specification are words of description rather than limitation, and it is understood that various changes may be made without departing from the spirit and scope of the disclosure and claims. The various core arrangements, for example, may be manufactured as one piece using additive manufacturing techniques, etc.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive vehicle comprising:
   a traction battery;
   an electric machine; and
   a variable voltage converter configured to transfer power between the traction battery and electric machine, wherein the variable voltage converter has an inductor including a core having a pair of spaced apart legs and a winding wound around each of the legs, wherein each of the legs defines a series of rectangularly shaped cavities completely internal to the leg that create hidden air gaps between portions of the leg.

2. The automotive vehicle of claim 1, wherein each of the legs includes a plurality of alternating frames and solid blocks and wherein each of the frames surrounds one of the rectangularly shaped cavities.

3. The automotive power converter of claim 2, wherein a material permeability of the frames is less than a material permeability of the solid blocks.

4. The automotive power converter of claim 2, wherein a material of the frames and solid blocks is same.

5. The automotive power converter of claim 2, wherein a number of the frames is greater than a number of the solid blocks.

6. The automotive power converter of claim 1, wherein the core further has a pair of yokes in contact with opposite ends of the legs such that the core has a toroidal shape.

7. The automotive power converter of claim 1, wherein the leg includes a plurality of blocks, each defining a recessed portion on at least one major face thereof, stacked together to form a continuous contact surface for the winding such that the recessed portions define the rectangularly shaped cavities.

8. An automotive power converter comprising:
   a pair of series connected switches; and
   an inductor including a core having a leg, a winding wound around the leg, and a terminal center tapping the switches, wherein the leg includes a plurality of alternating frames and solid blocks arranged to define a continuous contact surface for the winding and to define hidden internal cavities within the leg such that each of the frames surrounds one of the internal cavities.

9. The automotive power converter of claim 8, wherein a material permeability of the frames is less than a material permeability of the solid blocks.

10. The automotive power converter of claim 8, wherein a material of the frames and solid blocks is same.

11. The automotive power converter of claim 8, wherein the core further has a second leg spaced away from the first leg and wherein the winding is wound around the second leg.

12. The automotive power converter of claim 11, wherein the core further has a pair of yokes in contact with opposite ends of the leg such that the core has a toroidal shape.

13. The automotive power converter of claim 12, wherein a material permeability of the frames is less than a material permeability of the yokes.

14. The automotive power converter of claim 1, wherein a number of the frames is greater than a number of the solid blocks.

15. An automotive power converter comprising:
   a pair of series connected switches; and
   an inductor including a core having a leg, a winding wound around the leg, and a terminal center tapping the switches, wherein the leg includes a plurality of blocks, each defining a recessed portion on at least one major face thereof, stacked together to form a continuous contact surface for the winding such that the recessed portions define cavities completely internal to the leg that create internal hidden air gaps between the blocks.

16. The automotive power converter of claim 15, wherein the core further has a second leg spaced away from the first leg and wherein the winding is wound around the second leg.

17. The automotive power converter of claim 16, wherein the core further has a pair of yokes in contact with opposite ends of the leg such that the core has a toroidal shape.

18. The automotive power converter of claim 15, wherein the cavities are rectangularly shaped.

* * * * *